Sept. 4, 1951  P. C. CAMERON  2,566,595
TEETHING AID
Filed Sept. 28, 1949

INVENTOR
PETER C. CAMERON
BY
ATTORNEY

Patented Sept. 4, 1951

2,566,595

UNITED STATES PATENT OFFICE 2,566,595

TEETHING AID

Peter C. Cameron, Washington, D. C.

Application September 28, 1949, Serial No. 118,211

6 Claims. (Cl. 128—359)

1

The present invention relates to improvements in teething devices and is concerned more particularly, with devices to aid human teething and/or to sooth inflamed gums, adapted especially for infants but also usable with facility by adults.

It has long been the practice to relieve the pain of sore and inflamed human gums resulting from the growth of new teeth, the extraction of existing teeth or other causes by the application of cold bodies such as ice. Disadvantages however, are attendant upon such practice among them the difficulty of selectively positioning and maintaining ice in the desired area and the discomfort or injury, particularly to infants, resulting from swallowing the melting ice water.

It is an object of the present invention to avoid the disadvantages as heretofore encountered and to provide a unitary device which will efficiently and effectively relieve pain in any desired region of the jaws in a harmless and sanitary manner.

A further object of the invention is to provide a device of particular aid to teething infants which is constructed and arranged to be clamped between the jaws and to present a projecting portion adapted to be rubbed against the gums to facilitate the growth or entrance of infant teeth through the gum portion of the mouth.

Another object is to provide a device of simple and durable construction which may be employed with equal facility to apply a chilled surface to the gums or to be used as an ordinary nipple as well as an attractive plaything by infants.

Other and further objects and advantages of the present invention will be apparent from the following detailed explanation taken in conjunction with the accompanying drawings wherein a preferred embodiment of the principles of the invention has been selected for exemplification.

Figure 1:
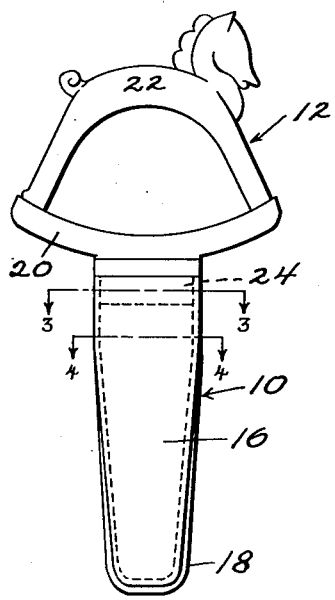
Fig. 1 is a front elevational view of a device constructed in accordance with the invention.
Figure 2:
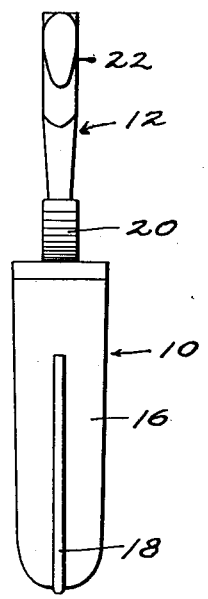
Fig. 2 is a side elevational view of the device shown in Fig. 1.
Figure 3:
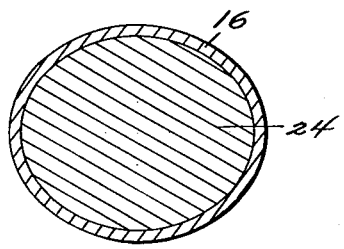
Fig. 3 is a sectional view taken on the line 3—3 of Fig. 1.
Figure 4:
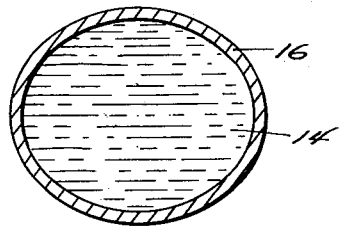
Fig. 4 is a sectional view taken on the line 4—4 of Fig. 1.

Referring more particularly to the drawings, wherein like numerals refer to like parts, the device as shown comprises in its essentials an elongated tubular member indicated in its entirety at 10 and a handle member indicated in its entirety at 12. The members 10 and 12 may be formed of any desired material, preferably resistant to boiling and freezing temperatures. A very satisfactory type of material has been selected from the various acetate or vinyl heat reactant resins which may be molded in the desired shapes.

The tubular member 10 may be hollow for receiving a suitable cold retentive substance such as water or other freezable fluid indicated at 14 and the walls 16 thereof preferably are relatively resilient or flexible but may under some circumstances be of a relatively rigid character. The desirable shape and size of the tubular member 10 are such that it may be readily and comfortably inserted in the human mouth and held adjacent to or gripped between opposed upper and lower portions of the gums.

The extrusion of teeth through the gums can usually be expedited and discomfort to the user relieved by the rib or bead 18 integral with and extending longitudinally of the member 10 and which is adapted to be pressed against the gums either manually or by gripping action of the jaws. As shown, the rib 18 preferably extends along the opposed wide side wall portions of the oval-shaped tubular member 10 and continuously across the free extremity thereof.

The handle 12 desirably is in the form of an elongated base portion 20 which extends a substantial distance outwardly beyond opposed ribbed sides of the tubular member 10 to provide an abutment limiting the distance the tubular member may be inserted into the mouth and preventing swallowing. The arcuate outer portion 22 of the handle may be molded integrally with the base portion 20 and, as shown, provides therewith a loop for insertion of a finger of the user for convenient handling of the device.

For securing the handle 12 and the tubular member 10, a shank 24 may be formed integrally with the base portion 20 and of such length and configuration that the shank may project a short distance into the open end of the tubular member 10 in close engagement with the adjacent inner side wall portions thereof. The shank 24 may be cemented or fused to the tubular member 10 to form a fluid tight seal for the water or other fluid 14.

Prior to use, the entire device may be placed in the freezing compartment of an ice box and when the liquid 14 becomes frozen the device is then ready for use. By means of the rigid connection thus formed between the parts it will be apparent that the user may readily manipulate the handle 12 to position the tubular part 10 in any portion of the mouth without the necessity of touching or otherwise risking contamination of the latter gum engaging member. The handle 12 being of solid material will dissipate its absorbed cold readily and will remain comfortable to the touch. When the liquid 14 has melted, if pain still persists the operation may be repeated with a second device while the original device is sterilized if desired and refrozen. The device is also capable of use with the liquid 14 at normal or heated temperatures.

It will be understood that the present invention is not confined to the precise construction and arrangement of parts as herein illustrated and described but embraces all such modified forms thereof as come within the scope of the following claims.

What I claim is:

1. A teething aid comprising, a hollow tubular member adapted to receive a freezable liquid, and a handle member rigidly connected with said tubular member for selectively positioning the latter in a human mouth, the said handle member including an elongated portion extending outwardly a substantial distance beyond the sidewall of said hollow tubular member.

2. The device of claim 1 wherein the hollow tubular member is formed of relatively thin resilient material and the handle is formed of relatively rigid material.

3. The device of claim 2 wherein the handle is provided with a rigid shank and said shank is in engagement with the tubular member as a water-tight closure for the latter.

4. A teething aid comprising, a tubular member for insertion in a human mouth, an elongated exterior rib integral with the side wall of said tubular member and a handle member integral with said tubular member, the said handle member including an elongated portion extending outwardly a substantial distance beyond the side wall of said tubular member.

5. The device of claim 4 wherein the tubular member is hollow and contains a body of freezable liquid.

6. A teething aid and gum soothing device comprising, an elongated tubular body having relatively thin walls formed of synthetic resinous material and containing a freezable liquid, the said tubular body being substantially oval-shaped in transverse section and tapering slightly toward the free end thereof, an outwardly projecting rib integral with said tubular body and extending continuously along one side thereof across said free end and along the opposed side thereof, and a handle member having an integral shank projecting partially into the opposite end of said tubular member and secured to a peripheral inner wall portion of said tubular member to provide a liquid tight seal, the said handle member having an elongated base portion extending outwardly a substantial distance beyond the opposed rib carrying side portions of said tubular member and having an arcuate outer portion integral with said base portion and forming therewith a loop for the insertion of a finger of the user.

PETER C. CAMERON.

REFERENCES CITED

The following references are of record in the file of this patent:

UNITED STATES PATENTS

| Number | Name | Date |
|---|---|---|
| 2,421,574 | Newmark | June 3, 1947 |